Figure 1:
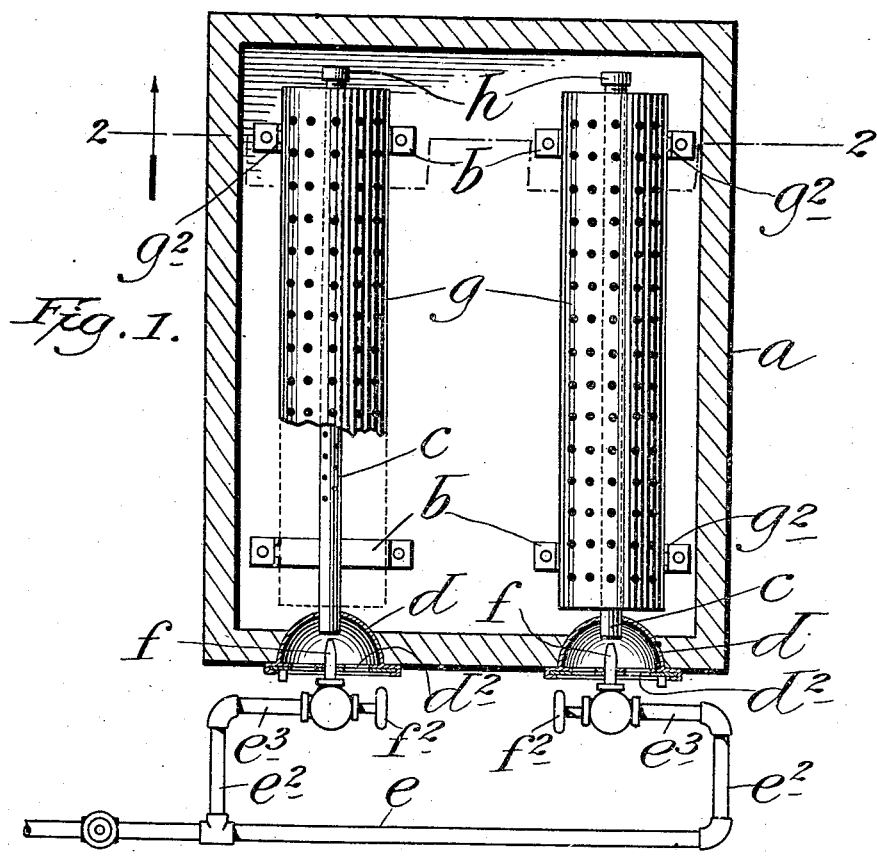

L. BLOOMBERG.
APPARATUS FOR CURING AND SMOKING MEATS.
APPLICATION FILED JAN. 6, 1908.

935,886.

Patented Oct. 5, 1909.

WITNESSES
C. E. Mulreany
M. E. Doody

INVENTOR,
Louis Bloomberg,
BY Edgar Tate & Co.
ATTORNEY.

UNITED STATES PATENT OFFICE.

LOUIS BLOOMBERG, OF NEW YORK, N. Y., ASSIGNOR OF ONE-HALF TO SAUL FINK, OF NEW YORK, N. Y.

APPARATUS FOR CURING AND SMOKING MEATS.

935,886. Specification of Letters Patent. Patented Oct. 5, 1909.

Application filed January 6, 1908. Serial No. 409,402.

*To all whom it may concern:*

Be it known that I, LOUIS BLOOMBERG, a citizen of the United States, and residing at New York, in the county of New York and State of New York, have invented certain new and useful Improvements in Apparatus for Curing and Smoking Meats, of which the following is a specification, such as will enable those skilled in the art to which it appertains to make and use the same.

This invention relates to apparatus for smoking and curing meat, and particularly to apparatus for this purpose of the class described and claimed in United States Letters Patent, #812,922, granted to William Eppinger, Feb. 20, 1906, and which involves a suitable box or housing in which the meat to be smoked and cured is placed, and apparatus for burning gas to produce the necessary heat and other products of combustion for curing and smoking the meat.

The invention is fully disclosed in the following specification, of which the accompanying drawing forms a part, in which the separate parts of my improvement are designated by suitable reference characters in each of the views, and in which;—

Figure 2:
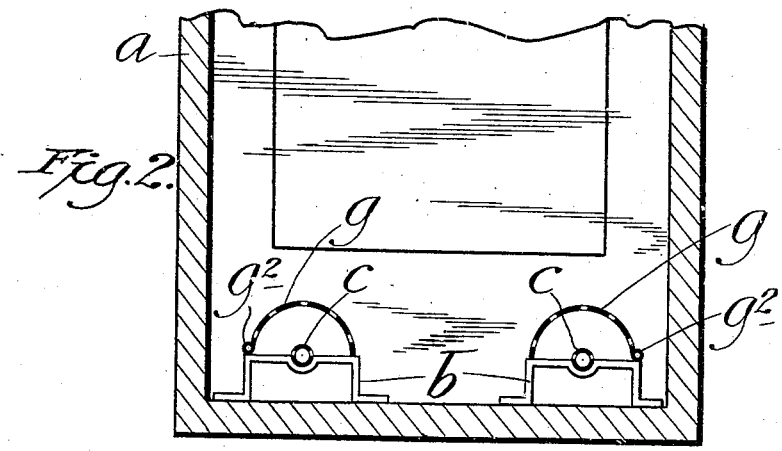

Figure 1 is a plan view of the apparatus which I employ, said apparatus being placed in a suitable box or housing, and said apparatus being also partly in section, and;— Fig. 2 a section on the line 2—2 of Fig. 1.

In the drawing forming part of this specification, I have shown at $a$ a suitable box or housing which may be of any desired dimensions, and which in practice is provided with a door and an outlet for the gases of combustion, and in which the meat to be cured and smoked is placed, all as in the patent hereinbefore referred to.

In the practice of my invention I place in the bottom of the box or housing, or on the floor thereof suitable supports $b$ which are arranged in pairs, in the form of construction shown, and on which are placed gas burner tubes $c$. Connected with the front ends of the burner tubes $c$ are semi-spherical hoods $d$, the fronts $d^2$ of which are provided with air registers through which air may be admitted into said hoods, and these registers are so formed that the amount of air admitted may be regulated as described and the burner tubes $c$ extended into the said hoods $d$ as clearly shown in the drawing. The hoods $d$ are also placed in the front wall of the box or housing $a$, and arranged transversely of said box or housing, and in front thereof is a gas supply pipe $e$, having branches $e^2$ provided with supplemental branch pipes $e^3$, and these supplemental branch pipes $e^3$ extend transversely of, and in front of the hoods $d$ and each is provided with a nozzle $f$ controlled by a valve $f^2$, and the nozzles $f$ extend through the centers of the air registers $d^2$ of the hoods $d$ and are so arranged as to discharge gas into the pipes $c$.

It will be understood, that this construction forms what is commonly known as a Bunsen burner, the gas passing through the nozzles $g^2$ into the pipes $c$ and the air passing into the hoods $d$, and from said hoods into said pipes, and said gas and air are mingled in the ends of the pipes $c$ adjacent to the hoods $d$, said ends of said pipes forming mixing chambers. Each of the burner tubes $c$ is also provided with a perforated shield $g$, said shields being hinged to the supports $b$ at one side of the tubes $c$ as shown at $g^2$, and said shields may be turned back, or outwardly to uncover the burner tubes $c$, or may be turned into the position shown in the drawing to fully cover said tubes, and the object of the shields $g$ is to prevent a person or persons entering the box or housing $a$ from being burned by the flaming gas and air escaping from said burner tubes $c$.

I am aware that an apparatus of this class has heretofore been employed for the purpose of curing and smoking meat, but such apparatus did not involve the use of a Bunsen burner or burners, and such apparatus as heretofore made was much more expensive by reason of the fact that large quantities of gas were necessary, and such apparatus was more ineffectual than my improved apparatus, by reason of the fact that the use of a Bunsen burner or burners for the purpose of producing the necessary conditions for curing and smoking the meat is more effective than when gas is burned in the usual manner. The use of the perforated shields $g$ for the burner tubes $c$ is also a great advantage by reason of the fact that a person or persons may enter the box or housing $a$ when the apparatus is in operation, without danger of being burned, and said shields may be turned to one side to permit of the examination of and cleaning of the burner tubes $c$ whenever necessary, and said burner tubes are also provided at their rear ends with detachable caps $h$ to facilitate the cleaning of said tubes.

Having fully described my invention, what I claim as new and desire to secure by Letters Patent, is:—

An apparatus for curing meat comprising in combination with a housing, a plurality of longitudinal burner tubes, supports for said burner tubes, comprising rectangular yokes having intermediate downwardly formed bearings in which said burner tubes are supported, perforated semicyclindrical casings carried by said supports and located concentrically with and over said burner tubes, and Bunsen burners in communication with said burner tubes, said Bunsen burners comprising semi-spherical domes secured at their peripheral edges in said housing and having said burner tubes projected through their apexes, gas jets directed into the mouths of said burner tubes, circular closures secured over the openings in said domes, revoluble perforated shutters secured over said closures to regulate air supply into said domes, said domes having peripheral grooves in which said revoluble shutters operate.

In testimony that I claim the foregoing as my invention I have signed my name in presence of the subscribing witnesses this 4th day of January 1908.

LOUIS BLOOMBERG.

Witnesses:
C. E. MULREANY,
M. E. DOODY.